United States Patent [19]

Cohen

[11] 4,240,061
[45] Dec. 16, 1980

[54] DEVICES FOR THE MEASUREMENT OF THE PHYSICAL STATE OF A PNEUMATIC TIRE

[75] Inventor: Ellis Cohen, Glasgow, Scotland

[73] Assignee: Dunlop Limited, London, England

[21] Appl. No.: 14,614

[22] Filed: Feb. 23, 1979

[30] Foreign Application Priority Data

Mar. 4, 1978 [GB] United Kingdom ................ 8680/78
Nov. 30, 1978 [GB] United Kingdom ............ 46730/78

[51] Int. Cl.³ ............................................. B60C 23/04
[52] U.S. Cl. ..................................... 340/58; 340/539;
455/40; 455/99
[58] Field of Search ............... 340/58, 539; 200/61.22,
200/61.25; 325/28, 111, 117; 455/40, 95, 99

[56] References Cited

U.S. PATENT DOCUMENTS 3,895,347  7/1975  Takusagawa et al. ................ 340/58
3,950,726  4/1976  Fujikawa et al. ...................... 340/58

Primary Examiner—Alvin H. Waring
Attorney, Agent, or Firm—Stevens, Davis, Miller & Mosher

[57] ABSTRACT

A system for conveying to the driver of a vehicle information concerning the physical state of a tire, such as its inflation pressure, comprising an electrical signaling device mounted on the wheel and arranged to transmit signals to the driver via a circuit including a conduction path through the ground or road surface on which the vehicle is supported.

7 Claims, 5 Drawing Figures

DEVICES FOR THE MEASUREMENT OF THE PHYSICAL STATE OF A PNEUMATIC TIRE

This invention relates to devices for the measurement of the physical state of a pneumatic tire and particularly to devices for warning the driver of a vehicle fitted with pneumatic tires when the inflation pressure in one of the tires falls below a predetermined level. It also has application to the measurement of tire pressures and/or temperatures, for example when the vehicle is in motion.

According to the invention a system for conveying to the driver of a vehicle information concerning the physical state of a pneumatic tire fitted to a wheel of the vehicle comprises a sensing device associated with the tire and mounted on the tire or wheel for rotation therewith, a signaling device incorporated in or associated with the sensing device to generate an electrical signal bearing a known relationship to the physical effect to which the sensing device is responsive, a transmitting element associated with the tire to which said electrical signal is communicated, a receiving element arranged to be in communication with the transmitting element in an electrical circuit path comprising a portion of the tire in contact with the ground or road surface on which the vehicle is supported, and an indicating device responsive to signals received by the receiving element.

According to the invention also, a system for conveying to the driver of a vehicle information concerning the physical state of a pneumatic tire fitted to a wheel of the vehicle comprises a sensing device associated with the tire and mounted on the tyre or wheel for rotation therewith, a signaling device incorporated in or associated with the sensing device to generate an electrical signal bearing a known relationship to the physical effect to which the sensing device is responsive, said signal being in the form of electrical oscillations, a transmitting element associated with the tire to which said electrical oscillations are communicated, a receiving element arranged to be in electrical communication with the transmitting element in an electrical circuit path comprising a portion of the tyre in contact with the ground or road surface on which the vehicle is supported and an indicating device responsive to signals received by the receiving element.

In a preferred example as applied to a tire low-pressure warning system for a motor car in which the front wheels are carried on suspension members which are to a large extent electrically insulated from the chassis and body of the car by electrically poorly-conductive bearing bushes, the transmitting element may consist of a wire or metallic tape secured to the inner surface of a tire tread region and connected to one output terminal of an oscillator carried on the wheel rim, the other output terminal of the oscillator being electrically connected to the wheel, and the receiving element being the suspension member.

One embodiment of the invention will now be described, with reference to the accompanying drawings in which.

Figure 1:
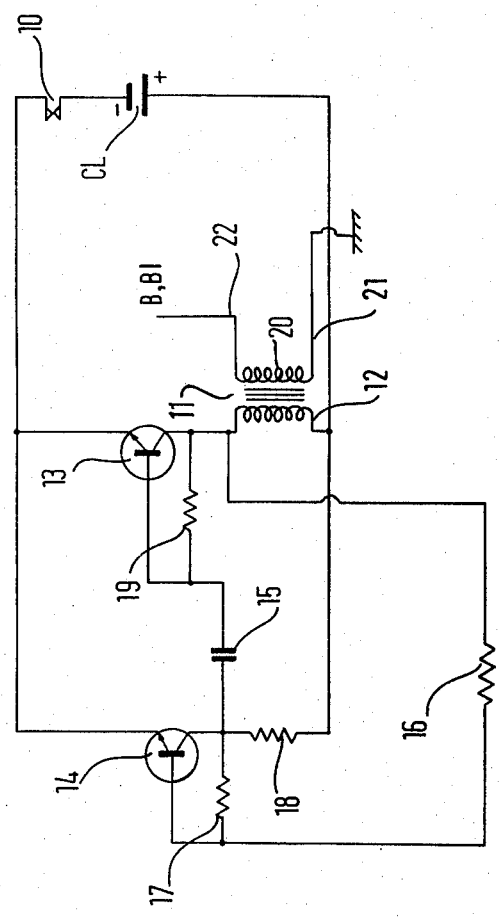
FIG. 1 is a diagram showing the arrangement of a sensing device, oscillator, and transmitting element arranged to be carried by a vehicle wheel.
Figure 5:
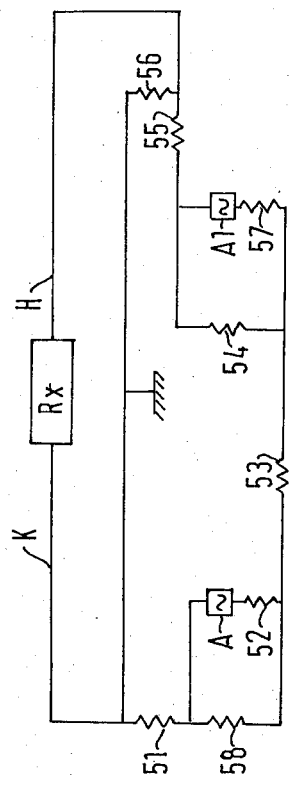
FIG. 5 is an electrical circuit diagram corresponding to FIG. 4.

As shown in FIG. 1, normally open contacts 10 are arranged to be closed by an associated pressure switch mechanism of known type, mounted in the wheel rim (not shown), whenever the tire pressure falls below a predetermined level. The contacts 10 are connected in a transducer arrangement ($A, A_1$ in FIGS. 3-5) for responding to the tire pressure drop, comprising an oscillator circuit including a transformer 11 having its primary winding 12 connected in series with a transistor 13 which is supplied with current by a cell CL whenever the contacts 10 are closed.

The transistor 13 is connected in an oscillator circuit comprising a transistor 14, capacitor 15 and resistors 16, 17, 18, 19. An oscillating current in the primary winding 12 of the transformer 11 generates an oscillating voltage in a secondary winding 20 which is grounded at its end 21 to the hub $C, C_1$ on which the wheel is mounted (for example through a connection to a metal wheel body), its other end 22 being insulated from the wheel and connected to a transmitting element such as a flexible wire or metallic tape (B and B1) secured to the inner surface of the tire tread region.

Figure 3:
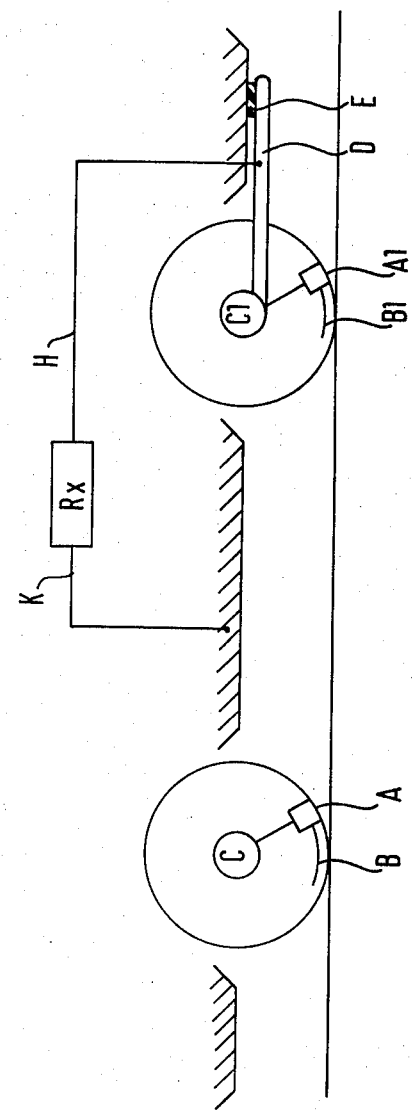
FIG. 3 is a diagrammatic representation of the installation of a receiving and signaling system in a vehicle.

In many vehicle body designs it has been found that the body is to a considerable extent electrically insulated, e.g. by rubber bushes E from the suspension members D which carry the front wheel hubs C1, and in accordance with the invention use has been made of this fact by using the suspension member itself to form a receiving element which can be electrically connected to a signalling circuit Rx (see FIG. 3).

Figure 2:
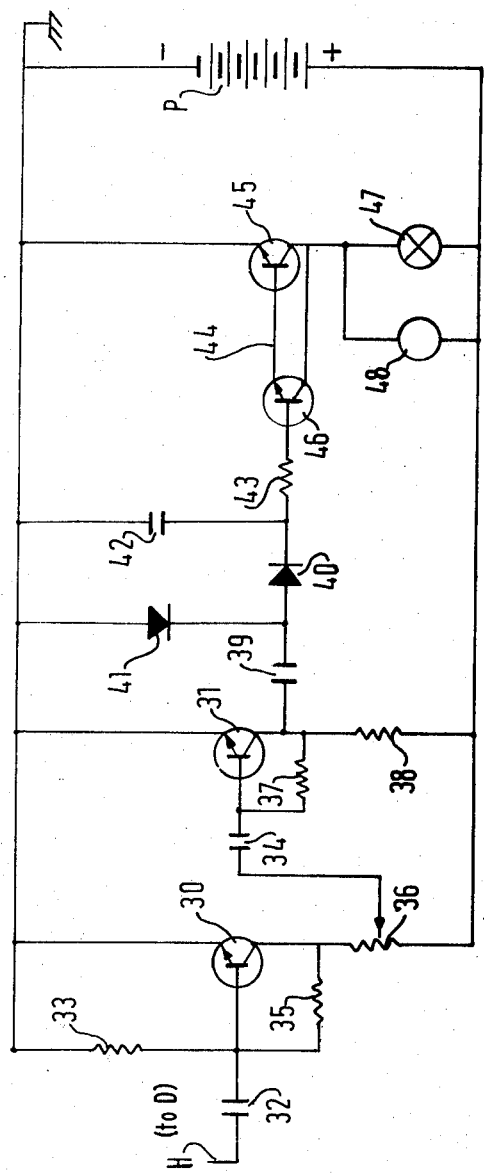
FIG. 2 is a diagram showing a receiving and signaling system arranged to be carried by the vehicle.

The signaling circuit, as shown in FIG. 2, comprises a receiving amplifier incorporating transistors 30, 31. The oscillatory voltage at the input H is passed to the base of transistor 30 through a coupling capacitor 32, the voltage being developed across a resistor 33 connected between the transistor base and ground (provided by the vehicle body, to which the negative terminal of the normal vehicle battery P is also grounded).

The amplifier, which comprises transistors 30 and 31 and associated capacitors 32, 34 and resistors 33, 35, 36, 37, 38, passes an amplified AC signal through capacitor 39 to a rectification circuit comprising diodes 40, 41, and the resulting DC signal charges capacitor 42 to operate, through resistor 43, a trigger circuit 44 comprising transistors 45 and 46. The trigger circuit 44 is thus arranged to operate a warning lamp 47 and audio alarm 48 whenever a signal is generated by the oscillator circuit attached to a wheel, in response to a predetermined loss of pressure in the associated tire.

Figure 4:
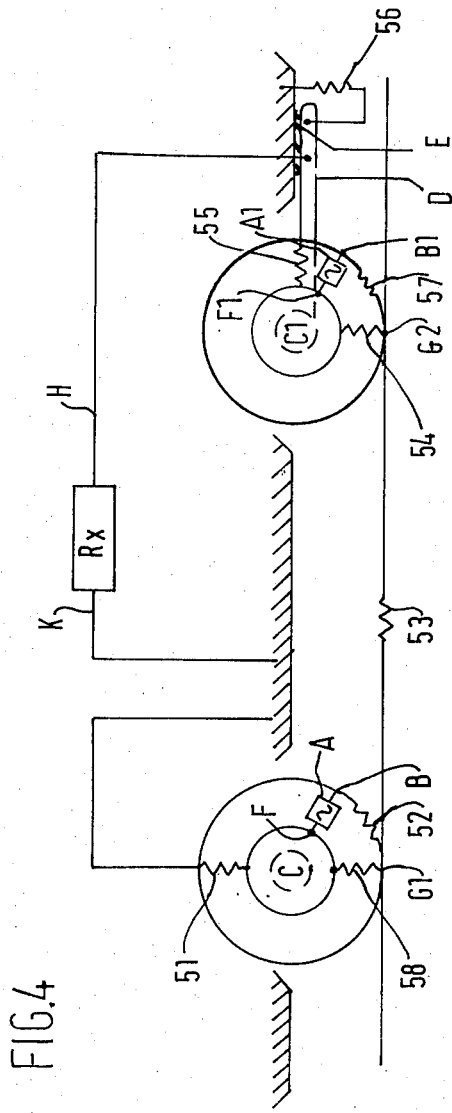
FIG. 4 is a diagram showing the paths of signals arising in the system installation shown in FIG. 3.

FIG. 4 illustrates the electrical conduction paths along which signals from oscillators in units $A, A_1$ can reach the receiver Rx. One terminal of each of the oscillators is electrically connected to the associated wheel rim at points $F, F_1$ and in respect of the rear wheel this provides a connection to the vehicle chassis through the rear wheel hub C and the bearings by which it is rotatably mounted on its axle: this connection is indicated in FIG. 4 by a resistor 51 since the bearings may provide quite a high electrical resistance in some circumstances.

The other terminal of the oscillator A is connected by a flexible wire B adhesively secured to the interior surface of the tire in the centre of the tread or crown region: this provides a resistive path 52 through the tire and along its tread surface to the road at the contact area $G_1$. The wire B may alternatively be arranged to make contact with the tread region of the tire under the action of centrifugal force as the wheel rotates: in this arrangement it is not secured to the tread but lies freely in the tire/rim cavity, being attached at one end only to the oscillator terminal. The contact area $G_1$ of the rear tire is connected to the contact area $G_2$ of the front tire by a resistive path along the road surface indicated by resistor 53, and whilst the resistance of this path obviously varies with the type of road surface and with the presence or absence of moisture it has been found to be generally adequate to transmit a signal.

From the contact area $G_2$ of the front tire the signal from the rear wheel is then transmitted through the material of the front tire to the front wheel, the resistance of the path through the tire material being indicated by resistor 54. The signal then passes through the front wheel bearings to the suspension arm D, this portion of the path being indicated by resistor 55, and thence to one side H of the receiver Rx the other side K of which is connected to the car body and thus to the opposite side of the oscillator by the path previously described. It will be noted that there is a possible conduction path to chassis through the suspension bushes indicated at E (equivalent resistor 56) but provided that resistor 56 has a high value a signal will still appear at the input to the receiver Rx.

The signal paths for the oscillator in unit A1 associated with the front wheel are similar to those described above. One output terminal of the oscillator is connected at F1 to the wheel and thence to the input of the receiver Rx via resistor 55. The other output terminal of the oscillator of A1 is connected by a flexible wire B1 to the tire interior in the tread region similarly to the arrangement in the rear wheel, and thence through the tire material and along the tread outer surface, indicated by resistor 57, to the contact area $G_2$. The circuit then continues through the road surface (resistor 53) to the rear tire contact area $G_1$, through the rear tire material (resistor 58) to the rear wheel hub C, and thence through the path (resistor 51) described above to the vehicle body or chassis.

There are of course possible signal paths between the two front tires and between the two rear tires, and also diagonally between a front tire and a rear tire, but it is believed that the mechanism by which signals may be transmitted to the receiver is best understood from the examples described above.

It is an important advantage of the system described above that only one receiving element is needed for all four wheels. This provides considerable economies in production and installation costs.

It has been found that an oscillator frequency of 400 Hertz is effective, and at this frequency it seems probable that the signal is transmitted almost entirely by conduction. At higher frequencies the signal may also be transmitted to a significant extent by a capacitive coupling in some parts of the circuits.

In order to avoid actuation of the system by spurious signals it may be advisable in some instances to provide a suitable input filter in the receiver Rx, such as a low-pass or narrow band-pass filter.

Whilst in the example described above both visual and audio warnings are provided when undue loss of tire pressure occurs, either a visual or an audio warning alone may be provided.

The pressure switch may be mounted in the wheel rim or may be mounted on another part of the wheel, communicating with the tire inflation cavity or inner tube by means of a suitable conduit.

Instead of sensing pressure changes, the system described above could be actuated by other means such as a temperature sensor or means for measuring tire side-wall deflection to detect the effects of a loss of inflation pressure.

In certain vehicles, particularly those with front-wheel drive, it may be found that all of the wheels are electrically connected to the vehicle chassis. In such a case, the system cannot operate as described above with a suspension member connected to the wheel providing a convenient receiving element: instead it is necessary to use an insulated receiving element adjacent one of the tires to receive signals from the tire through electric field coupling. In one example it has been found possible to use a suspension strut or shock-absorber (which was mounted at each end on rubber bushes) as the receiving element, but in this case it was necessary to provide a greater gain in the amplifier of the signaling circuit to compensate for the weaker signal. An alternative would be to provide a receiving element in the form of an insulated plate mounted adjacent one of the tires.

Having now described my invention, what I claim is:

1. A system for conveying to the driver of a vehicle information concerning the physical state of a pneumatic tire fitted to a wheel of the vehicle comprising a sensing device associated with the tire and mounted on the tire or wheel for rotation therewith, a signaling device incorporated in or associated with the sensing device to generate an electrical signal bearing a known relationship to the physical state to which the sensing device is responsive, a transmitting element associated with the tire to which said electrical signal is communicated, a receiving element arranged to be in communication with the transmitting element in an electrical circuit path means comprising a portion of the tire in contact with the ground or road surface on which the vehicle is supported, the ground or road surface, and an indicating device responsive to signals received by the receiving element.

2. A system for conveying to the driver of a vehicle information concerning the physical state of a pneumatic tire fitted to a wheel of the vehicle comprising a sensing device associated with the tire and mounted on the tire or wheel for rotation therewith, a signaling device incorporated in or associated with the sensing device to generate an electrical signal bearing a known relationship to the physical state to which the sensing device is responsive, said signal being in the form of electrical oscillations, a transmitting element associated with the tire to which said electrical oscillations are communicated, a receiving element arranged to be in electrical communication with the transmitting element in an electrical circuit path means comprising a portion of the tire in contact with the ground or road surface on which the vehicle is supported, the ground or road surface, and an indicating device responsive to signals received by the receiving element.

3. A system according to claim 2 wherein the signaling device comprises an electrical oscillator associated with a sensing device in the form of a pressure responsive switch arranged to connect a power supply to the oscillator whenever the tire inflation pressure falls below a predetermined value.

4. A system according to claim 3 wherein the oscillator and pressure-responsive switch are mounted, with a power supply cell, inside the tire/rim cavity and the output from the oscillator is connected at one side to the wheel and at the other side to a transmitting element in the form of a conductor contacting the inner surface of the tire.

5. A system according to claim 4 wherein a part of the conductor lies freely inside the tire/rim cavity and is arranged so that it is moved under centrifugal force as the wheel rotates to contact the inner surface of the tread region of the tire.

6. A vehicle comprising a system in accordance with claim 2 wherein at least one wheel is carried on a support which is insulated to a considerable extent from the vehicle body, said support constituting a receiving element.

7. A vehicle comprising a system in accordance with claim 2 wherein a receiving element insulated from the vehicle chassis and wheels is arranged to receive signals from an adjacent tire.

* * * * *